United States Patent [19]

Hasegawa et al.

[11] Patent Number: 4,693,562

[45] Date of Patent: Sep. 15, 1987

[54] LIQUID CRYSTAL DISPLAY DEVICE

[75] Inventors: Shinji Hasegawa; Yasuhiko Kando; Tamihito Nakagomi, all of Mobara, Japan

[73] Assignee: Hitachi, Ltd., Tokyo, Japan

[21] Appl. No.: 805,787

[22] Filed: Dec. 6, 1985

[30] Foreign Application Priority Data

Dec. 7, 1984 [JP] Japan .................. 59-257547

[51] Int. Cl.$^4$ ............................................ G02F 1/137
[52] U.S. Cl. ................ 350/337; 252/299.01; 350/341; 350/346
[58] Field of Search .................. 350/337, 341, 346

[56] References Cited

U.S. PATENT DOCUMENTS

| | | | |
|---|---|---|---|
| 4,418,987 | 12/1983 | Takanashi et al. | 350/337 |
| 4,522,436 | 11/1985 | Kozaki et al. | 350/337 |
| 4,522,468 | 6/1985 | Goscianski | 350/337 |
| 4,609,255 | 9/1986 | Leenhouts et al. | 350/341 |

FOREIGN PATENT DOCUMENTS

| | | | |
|---|---|---|---|
| 0037450 | 3/1977 | Japan | 350/341 |
| 0049854 | 4/1977 | Japan | 350/337 |
| 0131854 | 11/1978 | Japan | 350/346 |
| 0092518 | 7/1981 | Japan | 350/337 |
| 0090618 | 6/1982 | Japan | 350/337 |
| 0222823 | 11/1985 | Japan | 350/337 |

Primary Examiner—John K. Corbin
Assistant Examiner—David Lewis
Attorney, Agent, or Firm—Antonelli, Terry & Wands

[57] ABSTRACT

A liquid crystal display device wherein a nematic liquid crystal having a positive dielectric anisotropy and added with a chiral material is sealed between a pair of upper and lower substrates so as to constitute a helical structure twisted within a range between 96° and 108° along a direction of thickness thereof, absorption axes of a pair of polarizing plates disposed on the upper and lower substrates constitute an angle between 63° and 73°, and a product $\Delta n \cdot d$ of a thickness d ($\mu$m) and an optical anisotropy $\Delta n$ of a liquid crystal layer falls within a range from 0.69 $\mu$m to 0.79 $\mu$m.

4 Claims, 3 Drawing Figures

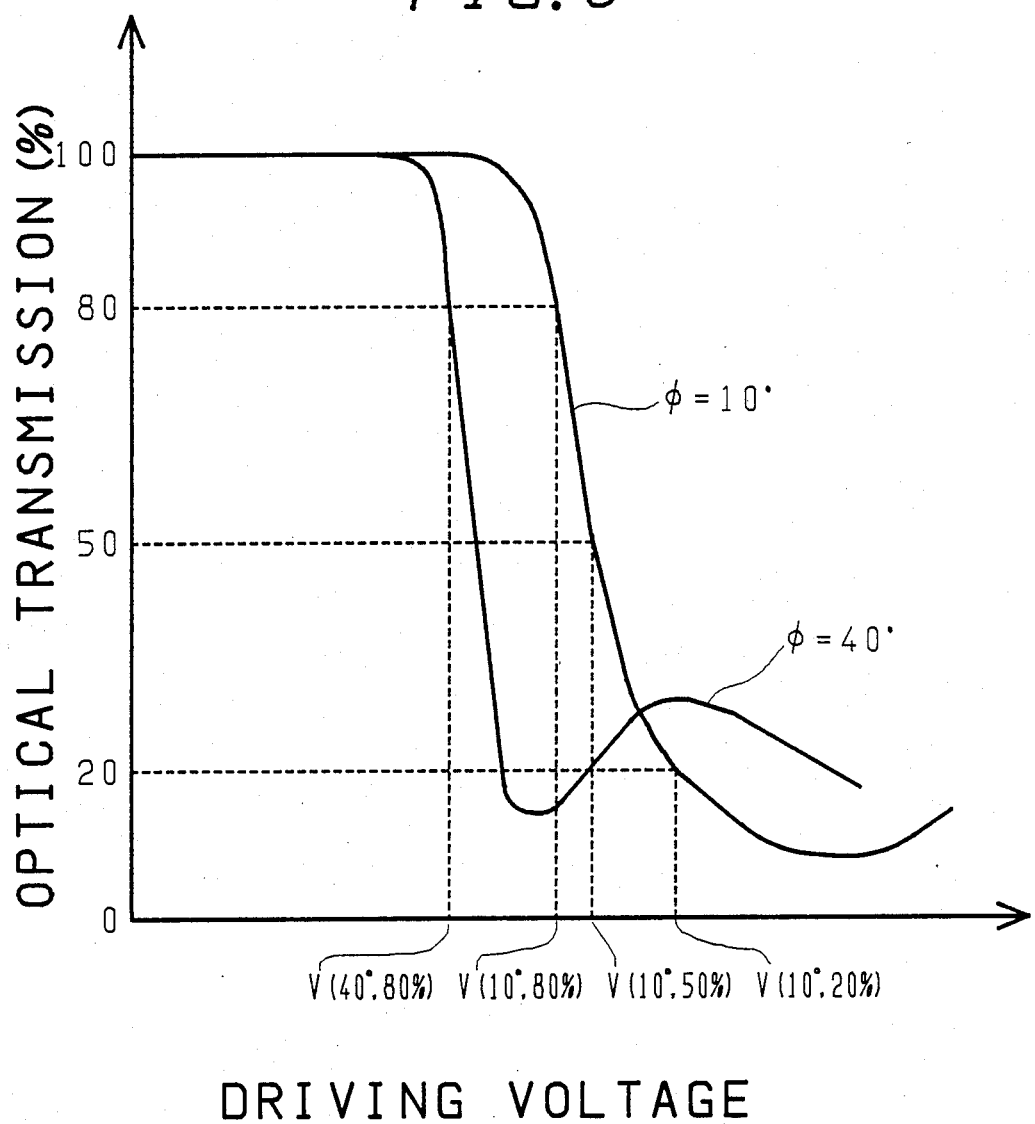

LIQUID CRYSTAL DISPLAY DEVICE

BACKGROUND OF THE INVENTION

The present invention relates to a liquid crystal display device and, more particularly, to an improvement in a field effect liquid crystal display device for time-multiplexed driving.

A conventional so-called twisted nematic liquid crystal display device has a 90° twisted helical structure of a nematic liquid crystal having positive dielectric anisotropy and sealed between two substrates having transparent electrodes arranged thereon in desired display patterns. Polarizing plates are arranged on outer surfaces of the substrates such that polarizing axes thereof become perpendicular or parallel to the major axes of the liquid crystal molecules adjacent to the substrates.

In order to twist the liquid crystal molecules between the two substrates through 90°, orienting layers are formed said electrodes and exposed surfaces of the substrates by coating polyimide resin and making numerous fine grooves by rubbing the coated surfaces which contact the liquid crystal molecules by a cloth along one direction. In this case, the major axes of the liquid crystal molecules adjacent to the surface become parallel to this one direction (i.e., a rubbing direction). Two rubbed surfaces are spaced apart so as to oppose each other while their rubbing directions are crossed by 90°. These rubbed substrates are then sealed with a sealing agent, and a nematic liquid crystal having positive dielectric anisotropy is filled in a space formed between the substrates. Therefore, the major axes of the liquid crystal molecules are twisted through 90° between the substrates. The resultant liquid crystal cell is sandwiched between a pair of polarizing plates with their polarizing axes substantially parallel or perpendicular to the major axes of liquid crystal molecules adjacent thereto, respectively. In a conventional reflective type liquid crystal display device which is most frequently used, a reflector is disposed on the outer surface of the lower polarizing plate. Light incident on the upper surface of the device is linearly polarized by the polarizing plate or polarizer. In a portion of a liquid crystal layer which is not applied with a voltage, the plane of polarization of the linearly polarized light is rotated through 90° along the helical structure and is transmitted through the lower polarizing plate. The light is then reflected by the reflector and returns to the upper surface of the device. However, in a portion of the liquid crystal layer which is applied with a voltage, where the helical structure is destroyed, the plane of polarization of the linearly polarized light will not be rotated. Therefore, the linearly polarized light transmitted through the upper polarizing plate is blocked by the lower polarizing plate and will not reach the reflector. In this manner, electrical signals can be converted into optical images in accordance with the presence or absence of an electrical potential applied across the liquid crystal layer.

The twisted nematic type liquid crystal display device (hereinafter referred to as "TN-LCD" for short), owing to its merits such as low driving voltage, low power consumption, small thickness, and light weight, has found extensive utility in wrist watches, desk computers, various industrial measuring instruments, and automotive instruments.

The dot matrix type TN-LCD which is capable of displaying letters and figures has long been arousing much interest as useful for terminal components in portable computers and various data processing units. At present, the grades of 64×480 picture elements, 128×480 picture elements, etc. adapted to operate at the duty factor of 1/64 are already on the market. The demand in market, however, is shifting to LCD's of still greater contents of display and information density such as those of 200×640 picture elements and 256×640 picture elements which are equivalent in display capacity to the cathode-ray picture tubes. For such LCD's to be commercially feasible, they are required to be effectively driven in a highly time-multiplexed fashion of the order of duty factor of 1/100 or 1/128.

Time-multiplexed driving will be briefly described with reference to a dot matrix display. As shown in FIG. 1, Y stripe electrodes (signal electrodes) 33 and X stripe electrodes (scanning electrodes) 34 are formed on the lower and upper substrates (not shown), respectively. Pixels (picture elements), liquid crystal portions at intersections of the X and Y electrodes 34 and 33 are chosen to be in an ON state or an OFF state so as to display characters or the like. N scanning electrodes X1, X2, . . . , Xn are repeatedly scanned in the order named in a time-multiplexed manner. When a given scanning electrode (e.g., X3 in FIG. 41 is selected, a selection or nonselection display signal is simultaneously applied to all pixels P31, P32, and P3m on the given scanning electrode through the signal electrodes 33 constituted by electrodes Y1, Y2, . . . and Ym in accordance with a display signal. In other words, the on/off operation of the pixels at the intersections of the scanning electrodes and the signal electrodes is determined by a combination of voltage pulses applied to the scanning and signal electrodes. In this case, the number of scanning electrodes X corresponds to the number of time-multiplexing.

When the TN-LCD is driven by the amplitude-selective addressing scheme (as described in U.S. Pat. No. 3,976,362 to Kawakami), the ratio of the rms voltage exerted on the "on" (selected) segment to that exerted on the "off" (non-selected) segment decreases and the display contrast declines in proportion as the number of time-multiplexing cycles increases. In order for the number of time-multiplexing cycles to be increased without a sacrifice of display contrast, the slope of the luminance-voltage characteristic curve must be increased appreciably in steepness. The question as to how the steepness of the variation caused on luminance by voltage should be improved poses as an important technical task on the way toward successful commercialization of highly time-multiplexed LCD's.

A study is being energetically promoted in search of improvements in and concerning characteristic properties of liquid crystal materials themselves with a view to enhancing the steepness of this variation of luminance. While this study has borne fruits in bringing about improvements of a measure, it has not yet succeeded in perfecting a material satisfying ample steepness. As another means of improving the steepness of variation of luminance, there has been widely adopted the method which consists in creating a deviation between the liquid crystal molecular axes and the polarization (or absorption) axes of the polarizing plates in the regions adjoining the surfaces of the upper and lower electrode substrates so as to satisfy the relationship that the twist angle, $\alpha$, of the liquid crystal molecules is greater than the intersecting angle, θ, of the polarization or absorption axes of the plarized plates.

Japanese Unexamined Patent Publication (Kokai) SHO 53(1978)-134,458, for example, discloses a configuration wherein the twist angle, α, is selected in the range of 94° to 106° and the intersecting angle, θ, of the polarizing axes of the polarized plates in the range of 74° to 86°. Japanese Unexamined Patent Publication (Kokai) SHO 55(1980)-95,929 discloses a configuration wherein for the purpose of enabling the intersecting angle between the polarization axes or absorption axes of the polarized plates to be smaller than the twist angle, α, of the liquid crystal molecules, the intersecting angle between the polarization axes or absorption axes of the polarized plates is selected among 80°, 85°, and 90° where the twist angle, α, of the liquid crystal molecules is 85° or the aforementioned intersecting angle between the polarization axes or absorption axes of the polarized plates is selected among 85°, 90°, and 95° where the twist angle, α, of the liquid crystal molecules is 90°. Japanese Unexamined Patent Publication (Kokai) SHO 56(1981)-92,518 discloses a configuration wherein the twist angle, α, of the liquid crystal molecules is selected in the range of 80° to 100° and the intersecting angle of the polarization axes of the polarized plates in the range of 74° to 84°. Japanese Unexamined Patent Publication (Kokai) SHO 59(1984)-40,623 discloses a configuration wherein the twist angle, α, of the liquid crystal molecules is selected in the range of 92° to 120° and the intersecting angle, θ, between the polarization axes of the polarized plates is selected so as to satisfy the formula, $180° \leq \alpha + O \leq 210°$. None of the configurations mentioned above simultaneously satisfies the requirements concerning the steepness of the luminance-voltage characteristic slope, the phenomenon of coloration of display surface, and the viewing angle dependency of luminance.

SUMMARY OF THE INVENTION

It is, therefore, an object of the present invention to provide a liquid crystal display device having a cell structure entirely different from that of the conventional liquid crystal display device and a twist angle, α, different from 90° of a conventional helical structure of nematic liquid crystal molecules, thereby providing excellent time-multiplexed drive characteristics and hence higher contrast ratio, wider acceptable range of viewing angles, and less coloring in display even if the number of time-multiplexing, that is, the number of scanning lines is more than 100.

According to one aspect of the present invention there is provided a liquid crystal display device wherein a nematic liquid crystal having a positive dielectric anisotropy is sealed between a pair of upper and lower substrates so as to constitute a helical structure twisted within a range between 96° and 108° along a direction of thickness thereof, an angle between absorption axes of a pair of polarizing plates disposed on the upper and lower substrates is within a range between 63° and 73°, and a product Δn·d of a thickness d (μm) and an optical anisotropy, an anisotropy in refractive index Δn of a liquid crystal layer falls within a range from 0.69 μm to 0.79 μm.

BRIEF DESCRIPTION OF THE DRAWINGS

FIG. 3 is a graph showing the luminance-voltage characteristics of a conventional liquid crystal display device used in defining time-multiplexed characteristics.

DETAILED DESCRIPTION OF THE PREFERRED EMBODIMENTS

Figure 1:
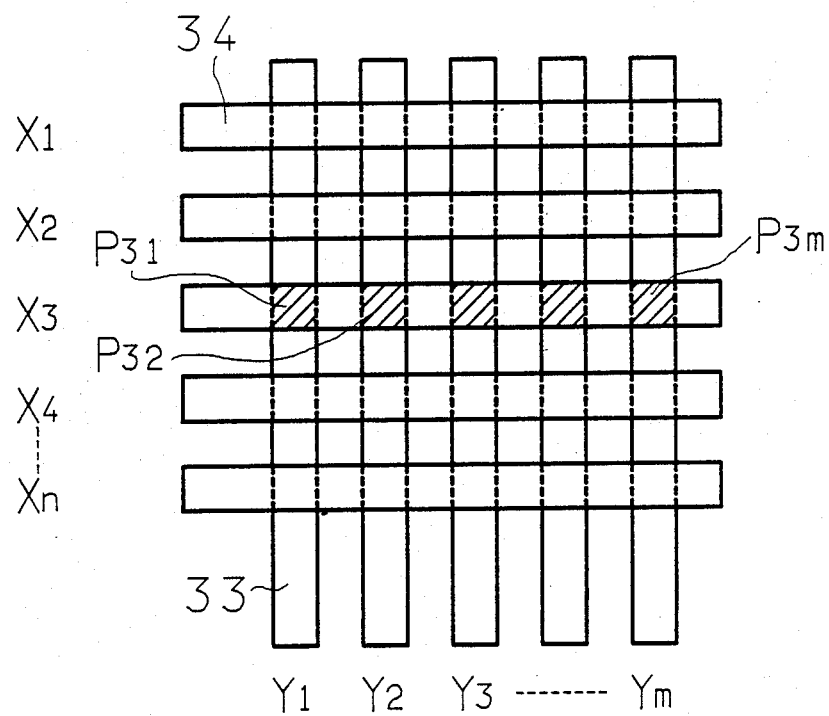
FIG. 1 is a representation for explaining time-multiplexed driving.
Figure 2:
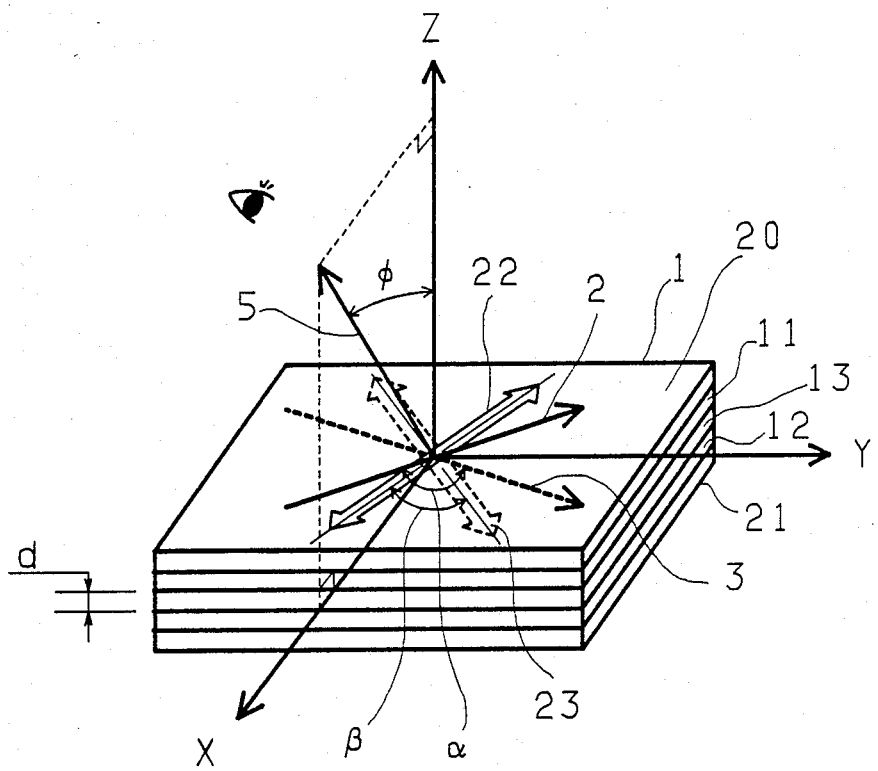
FIG. 2 is a perspective view of the liquid crystal display device for explaining the present invention.

Referring to FIG. 2, in an liquid crystal display device 1, a nematic liquid crystal 13 having positive dielectric anisotropy is sandwiched between two substrates 11, 12 having transparent electrodes arranged thereon in desired display patterns and orienting layers (not shown) which are formed on the electrodes and exposed surfaces of the substrates by coating, for example, polyimide resin and making numerous fine grooves by rubbing the coated surfaces with a cloth unidirectionally. A rubbing direction of an upper substrate 11 of a liquid crystal display device 1 is represented by reference numeral 2, a rubbing direction of a lower substrate 12 is represented by reference numeral 3, and a twist angle between liquid crystal molecules adjacent to the upper substrate and liquid crystal molecules adjacent to the lower substrate is represented by an upper polarizing plate (polarizer) on the upper substrate 11 and an lower polarizing plate on the lower substrate 12 are represented by reference numerals 20 and 21, respectively, and an angle between the absorption axis 22 of the upper polarizing plate 20 and the absorption axis 23 of the lower polarizing plate 21 is represented by β. X- and Y-axes are located on the surface of the liquid crystal display device 1. The X-axis defines a direction for bisecting the twist angle α of the liquid crystal molecules. A Z-axis defines a normal to the X-Y plane. An angle between a viewing direction 5 and the Z-axis is defined as the viewing angle φ. In this case, by way of simplicity, the viewing direction 5 is in the X-Z plane. The viewing angle φ in FIG. 2 is regarded to be positive. Since contrast becomes high when viewed from a direction in the X-Z plane, this direction is called the viewing direction 5.

Performance parameters for a quantification of time-multiplexed driving characteristics in the subsequent description will be briefly described below.

FIG. 3 is a graph showing typical transmission-voltage characteristics of a transmissive twisted nematic type liquid crystal display device when its polarizing axes are crossed. The graph shows the relative transmission of light as a function of driving voltage. An initial value of transmission is taken as 100%, and a final value when no or little further change in transmission occurs at sufficiently high voltage is taken as 0%. At a viewing angle φ, a driving voltage giving 80% transmission, at which liquid crystal display device begins to appear to be "on" to an observer is designated by V(γ, 80%), and a driving voltage giving 20% transmission below which further decrease in transmission begins to be imperceptible to the eye is designated by V(γ, 20%), and a driving voltage giving 50% transmission, which is useful for evaluating characteristics of liquid crystal material itself independently of orienting layers is designated by V (γ, 50%).

Let γ of the following expression (1) stand for a parameter $$\gamma = \frac{V(10°, 20\%)}{V(10°, 80\%)} \qquad (1)$$

for the evaluation of the steepness of the transmission-voltage characteristic, and it will be noted that $\Delta\phi$ is smaller than 1 and that the steepness increases in proportion as the value of $\gamma$ approaches 1.

Let $\Delta\phi$ of the following expression (2) stand for another $$\Delta\phi = \frac{V(40°, 80\%)}{V(10°, 80\%)} \qquad (2)$$

parameter for the evaluation of the viewing angle dependency of transmission, and it will be noted that $\Delta\phi$ is smaller than 1 and that the viewing angle dependency decreases, i.e. the range of acceptable angle of vision widens, in proportion as the value of $\Delta\phi$ approaches 1.

When the lower limit of the twist angle, $\alpha$, is fixed at 90° C., the steepness of the transmission-voltage characteristic slope is notably improved in proportion as the difference between the twist angle, $\alpha$, and the intersecting angle, $\beta$, of the absorption axes of the polarized plates increases. If the difference between $\alpha$ and $\beta$ grows to excess, however, there ensues the disadvantage that the deviation between the major axes of liquid crystal molecules and the absorption axes of the polarized plates adjoining the surfaces of the upper and lower substrates widens and the phenomenon of coloration due to optical rotary dispersion gains in prominence.

The steepness of the variation of transmission is heavily affected by the value of the product, $\Delta n \cdot d$ (μm), of the anisotropy in refractive index of the liquid crystal, $\Delta n$, multiplied by the thickness, d, of the liquid crystal layer. The steepness of the transmission-voltage characteristic slope tends to be improved with the increasing value of the product, $\Delta n \cdot d$, and the substantially saturated as the value of the product reaches the neighborhood of 1.0 μm. On the other hand, the variation of transmission by the viewing angle $\phi$, i.e. the viewing angle dependency of transmission, tends to be increased with the increasing value of the product, $\Delta n \cdot d$, contrarily to the steepness of the transmission-voltage characteristic slope.

Where emphasis is placed on transmission, satisfactory results are obtained by selecting the product, $\Delta n \cdot d$, in the neighborhood of 1.0 μm at a sacrifice of the broadness of the range of acceptable viewing angle (the range of angle in which ample perception of display is obtained). Where emphasis is placed on the broadness of the range of viewing angle, satisfactory results are obtained by selecting the product, $\Delta n \cdot d$, in the neighborhood of 0.5 to 0.6 μm at a sacrifice of the contrast of display. So long as the number of time-multiplexing cycles is up to about the medium level, practically satisfactory display contrast is obtained even when the value of the product, $\Delta n \cdot d$, is selected in the neighborhood of 0.5 to 0.6 μm. No practically acceptable display contrast is obtained, however, by a highly time-multiplexed driving at a duty factor of not more than 1/64 or 1/100. If, in an effort to overcome the difficulty, the value of $\Delta n \cdot d$ is fixed in the neighborhood of 1.0 μm in the highly time-multiplexed driving at a duty factor of not more than 1/64, however, the range of viewing angle loses width.

Now, this invention will be described specifically below with reference to working examples.

First, a liquid crystal mixture, I, was compounded of the following components.

| Component | wt % |
|---|---|
| $C_2H_5$—⟨O⟩—⟨O⟩—NC | 5 |
| $C_3H_7$—⟨O⟩—⟨O⟩—CN | 6 |
| $C_4H_9$—⟨O⟩—⟨O⟩—CN | 6 |
| $C_3H_7$—⟨H⟩—⟨O⟩—$OCOC_3H_7$ | 34 |
| $C_3H_7$—⟨H⟩—$CO_2$—⟨O⟩—$OC_5H_{11}$ | 7 |
| $C_4H_9$—⟨H⟩—$CO_2$—⟨O⟩—$OC_4H_9$ | 7 |
| $C_5H_{11}$—⟨H⟩—$CO_2$—⟨O⟩—$OC_3H_7$ | 6 |
| $C_2H_5$—⟨H⟩—⟨O⟩—$CO_2$—⟨H⟩—$C_3H_7$ | 13 |
| $C_4H_9$—⟨H⟩—⟨O⟩—$CO_2$—⟨H⟩—$C_3H_7$ | 16 |

This mixture I was found to have a $T_{NI}$ (nematic-isotropic transition temperature) of 65° C. and a $\Delta n$ of 0.106. The cells of Nos. 1, 2, and 3 indicated in Table 1 were prepared by incorporating 0.6% by weight of a chiral substance, C15 (product of BEH) therein for the purpose of precluding possible occurrence of reverse twist. In the cells of Nos. 1, 2, the twist angle, $\alpha$, was invariably 90° and the intersecting angle, $\beta$, of the absorption axes of the polarized plates was 80°. The cell of No. 1 which had a $\Delta n \cdot d$ of 0.53 μm was excellent in viewing angle dependency, $\Delta\gamma$, and deficient in the steepness, $\phi$, in the variation of transmission. In contrast, the cell of No. 2 which had a $\Delta n \cdot d$ of 1.05 μm was excellent in the steepness $\phi$ and deficient in viewing angle dependency $\Delta\gamma$.

In the configuration of conventional popular acceptance using a twist angle of 90° and an intersecting angle of 80°, it is difficult to fix the steepness, $\gamma$, and the viewing angle dependency, $\Delta\phi$, both at their respectively optimum values. As an approach to the elimination of this difficulty, an attempt was made to increase the twist angle beyond 90° and widen the difference between the twist angle, $\alpha$, and the intersecting angle, $\beta$, to a value in the range of 20° to 30°. It was consequently confirmed that under these conditions, the phenomenon of coloration due to optical rotary dispersion gained excessively in prominence when the deviation between the major axes of liquid crystal molecules and the absorption axes of the polarized plates adjoining the surfaces of the substrates.

TABLE 1

| Items | Liquid Crystal Cell | | |
|---|---|---|---|
| | 1 Comparative Example | 2 Comparative Example | 3 Comparative Example |
| Twist Angle $\alpha$ | 90° | 90° | 102° |
| Angle of Intersection $\beta$ | 80° | 80° | 68° |
| Thickness d | 5.0 μm | 9.9 μm | 7.0 μm |
| $\Delta n \cdot d$ (μm) | 0.53 | 1.05 | 0.74 |
| V (10°, 50%) | 2.25 V | 2.63 V | 2.22 V |
| $\gamma$ | 1.241 | 1.160 | 1.161 |
| $\Delta\phi$ | 0.902 | 0.878 | 0.916 |

The cell of No. 3 conforming to this invention had a twist angle, $\alpha$, of 102°, an intersecting angle, $\beta$, of 68°, and a $\Delta n \cdot d$ of 0.74 μm. By fixing the twist angle, $\alpha$, the intersecting angle, $\beta$, and the $\Delta n \cdot d$ as just described, the characteristic properties combining the excellent viewing angle dependency obtained in the cell of No. 1 and the excellent steepness obtained in the cell of No. 2 were materialized and, at the same time, the phenomenon of coloration due to optical rotary dispersion was mitigated enough to a practically tolerable level. In this configuration, the background of the display was in a bright gold color.

In the present invention, in order for the background color to be uniform throughout the entire surface of the display, it is necessary that the gap intervening between the substrates be controlled to be uniform. The desired control is attached by dispersing glass fibers of a uniform diameter as a spacer throughout the entire surface of the display, placing the liquid crystal in the cell, and sealing the cell so that the internal pressure of the cell will be slightly lower than the atmospheric pressure.

Table 2 shows other working examples of this invention. The compositions of the liquid crystal mixtures, II through IV, used in Examples 2 through 4 are shown in Table 3. In the configurations of Examples 2 through 4, the twist angles, $\alpha$, the intersecting angles, $\beta$, and the values of $\Delta n \cdot d$ invariably fell in the ranges conforming to the present invention. Thus, the configurations realized characteristic properties excellent in both $\gamma$ and $\Delta\phi$.

TABLE 2

| Item | Examples | | |
|---|---|---|---|
| | Example 2 Mixture II | Example 3 Mixture III | Example 4 Mixture IV |
| Twist Angle $\alpha$ | 100° | 103° | 101° |
| Angle of Intersection $\beta$ | 70° | 67° | 69° |
| $\Delta n \cdot d$ (μm) | 0.75 | 0.73 | 0.76 |
| V (10°, 50%) | 2.25 V | 2.18 V | 2.14 V |
| $\gamma$ | 1.159 | 1.145 | 1.152 |
| $\Delta\phi$ | 0.916 | 0.919 | 0.914 |

TABLE 3

| Composition | Mixture II | 5 wt % | Mixture III | 5 wt % | Mixture IV | 4 wt % |
|---|---|---|---|---|---|---|
| | C₂H₅—⬡—⬡—CN | 5 | C₂H₅—⬡—⬡—CN | 6 | C₂H₅—⬡—⬡—CO₂—⬡(F)—CN | 5 |
| | C₃H₇—⬡—⬡—CN | 6 | C₃H₇—⬡—⬡—CN | 6 | C₃H₇—⬡—⬡—CO₂—⬡(F)—CN | 7 |
| | C₄H₉—⬡—⬡—CN | 46 | C₄H₉—⬡—⬡—CN | 17 | C₃H₇—H⬡—⬡—OCOC₃H₇ | 24 |
| | C₃H₇—H⬡—⬡—OCOC₃H₇ | 17 | CH₃O—⬡—CO₂—⬡—C₅H₁₁ | 8 | C₅H₁₁CO₂—⬡—CO₂—⬡—C₃H₇ | 20 |
| | C₂H₅—H⬡—⬡—CO₂—⬡—C₃H₇ | 21 | C₆H₁₃O—⬡—CO₂—⬡—C₅H₁₁ | 11 | C₅H₁₁CO₂—⬡—CO₂—⬡—C₇H₁₅ | 10 |
| | C₄H₉—H⬡—⬡—CO₂—⬡—C₃H₇ | | C₃H₇—H⬡—CO₂—⬡—OC₄H₉ | 11 | C₃H₇—H⬡—CO₂—⬡—OC₄H₉ | 10 |
| | | | C₄H₉—H⬡—CO₂—⬡—OC₃H₇ | 11 | C₄H₉—H⬡—CO₂—⬡—OC₃H₇ | 10 |
| | | | C₄H₉—H⬡—CO₂—⬡—OC₅H₁₁ | 12 | C₄H₉—H⬡—CO₂—⬡—OC₅H₁₁ | 10 |
| | | | C₅H₁₁—H⬡—CO₂—⬡—OC₄H₉ | 2 | C₅H₁₁—H⬡—CO₂—⬡—OC₄H₉ | 10 |
| | | | C₃H₇—⬡—CO₂—⬡—H⬡—C₃H₇ | | | |
| $T_{NI}$ | 67° C. | | 58° C. | | 55° C. | |
| $\Delta n$ | 0.106 | | 0.118 | | 0.105 | |

The desirability of the characteristic $\gamma$ of the TN-LCD increases in proportion as the elastic constant ratio. $K_3/K_1$ (where $K_1$ and $K_3$ respectively stand for the splay elastic constant and the bend elastic constant) of the material for liquid crystal. A typical liquid crystal mixture using, as major components thereof, pyrimidine type compound which exhibit properties found advantageous by the conventional standard possesses a $K_3/K_1$ ratio of 0.75, one of the smallest of the $K_3/K_1$ ratios of all the countertype products currently available in the market. In the liquid crystal display device using this particular liquid crystal material, namely the cell having a twist angle, $\alpha$, of 90°, an intersecting angle, $\beta$, of 80°, and a $\Delta n \cdot d$ of 1.07 $\mu$m, the value of $\gamma$ is 1.156 and that of $\Delta\phi$ is 0.857. In the configurations of Examples 2 through 4, the values of characteristic $\gamma$ were equal to or better than the value just mentioned. The data clearly indicate that this invention brings about an excellent effect.

The composition of the liquid crystal mixture to be used in the present invention is not specifically defined. This invention proves particularly effective when it is worked with any of the compositions, I through IV, shown in the working examples, or any of the compositions similar thereto.

This invention is particularly effective when the twist angle, $\alpha$, is fixed at 102°, the intersecting angle, $\beta$, of the absorption axes of the polarized plates at 68°, and the value of $\Delta n \cdot d$ at 0.74. It produces a practically sufficient effect when the twist angle, $\alpha$, falls in the range of 102°±6°, the intersecting angle, $\beta$, in the range of 68°±5°, and the value of $\Delta n \cdot d$ in the range of 0.74±0.05. Preferably, the twist angle, $\alpha$, is in the range of 102°+4°, the intersecting angle, $\beta$, in the range of 68°±3°, and the value of $\Delta n \cdot d$ in the range of 0.74±0.04.

In accordance with this invention, the steepness of the variation of transmission and the viewing angle dependency of transmission can be improved both at the same time and the quality of display by the TN-LCD driven at a highly time-multiplexed fashion can be notably improved as described above.

What is claimed is:

1. A liquid crystal display device wherein a nematic liquid crystal having a positive dielectric anisotropy and added with a chiral material is sealed between a pair of upper and lower substrates with electrodes thereon and orienting layers on the electrodes and exposed surfaces thereof so as to constitute a helical structure twisted within a range between 96° and 108° along a direction of thickness thereof, absorption axes of a pair of polarizing plates disposed on said upper and lower substrates constitute an angle between 63° and 73°, and a product $\Delta n \cdot d$ of a thickness d ($\mu$m) and an optical anisotropy $\Delta n$ of a liquid crystal layer falls within a range from 0.69 $\mu$m to 0.79 $\mu$m.

2. A device according to claim 1, wherein said orienting layers are formed by rubbing surfaces coated by polyimide resin of electrodes and exposed substrates.

3. A device according to claim 1, wherein a nematic liquid crystal constitutes a helical structure twisted within a range between 98° and 106°, said absorption axes constitute an angle between 65° and 71°, and said product $\Delta n \cdot d$ falls within a range from 0.70 $\mu$m to 0.78 $\mu$m.

4. A device according to claim 1, wherein said electrodes on one of the substrates are stripe-shaped and driving voltages are impressed thereon in a time-multiplexed fashion.

* * * * *